US010086638B2

(12) United States Patent
Jones et al.

(10) Patent No.: US 10,086,638 B2
(45) Date of Patent: Oct. 2, 2018

(54) SYSTEM AND METHOD FOR LASER WRITING

(71) Applicant: MorphoTrust USA, LLC, Billerica, MA (US)

(72) Inventors: Robert Jones, Andover, MA (US); Daoshen Bi, Boxborough, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 84 days.

(21) Appl. No.: 14/877,851

(22) Filed: Oct. 7, 2015

(65) Prior Publication Data

US 2016/0096395 A1 Apr. 7, 2016

Related U.S. Application Data

(60) Provisional application No. 62/060,904, filed on Oct. 7, 2014, provisional application No. 62/142,315, filed on Apr. 2, 2015.

(51) Int. Cl.

| | |
|---|---|
| *B42D 25/435* | (2014.01) |
| *B23K 26/364* | (2014.01) |
| *B41M 3/14* | (2006.01) |
| *B42D 25/41* | (2014.01) |
| *B42D 25/48* | (2014.01) |
| *B42D 25/23* | (2014.01) |

(Continued)

(52) U.S. Cl.
CPC ............ *B42D 25/23* (2014.10); *B23K 26/364* (2015.10); *B41M 3/14* (2013.01); *B42D 25/30* (2014.10); *B42D 25/328* (2014.10); *B42D 25/41* (2014.10); *B42D 25/435* (2014.10); *B42D 25/48* (2014.10); *B42D 2033/10* (2013.01); *B42D 2033/22* (2013.01); *B42D 2035/02* (2013.01); *B42D 2035/12* (2013.01); *B42D 2035/20* (2013.01); *B42D 2035/44* (2013.01)

(58) Field of Classification Search
CPC ...... B42D 25/435; B42D 25/41; B42D 25/48; B41M 3/14; B23K 26/36
USPC ............ 219/121.68, 121.69; 216/24; 283/67; 430/320, 321
See application file for complete search history.

(56) References Cited

U.S. PATENT DOCUMENTS 5,569,398 A * 10/1996 Sun ........................ B23K 26/06
219/121.68
5,783,024 A 7/1998 Forkert
(Continued)

OTHER PUBLICATIONS

U.S. Appl. No. 60/529,847, filed Dec. 15, 2003, Gyi et al.
(Continued)

*Primary Examiner* — Samuel M Heinrich
(74) *Attorney, Agent, or Firm* — Fish & Richardson P.C.

(57) ABSTRACT

Personal data may be embedded in a kinegram of an identification document using a suitable low energy laser without compromising the integrity of the kinegram or the identification document. The personal data can be written in a metalized portion of the kinegram in a high definition, high resolution manner such that the personal data may be read by a human without the use of a text-enhancing viewer device (e.g., magnifying glasses). Additional personal data can be written in a reduced text size (e.g., micro-text) in another metalized portion of the kinegram such that a human must use a text-enhancing viewer device to view the micro-text personal data.

30 Claims, 11 Drawing Sheets

(51) Int. Cl.
*B42D 25/30* (2014.01)
*B42D 25/328* (2014.01)

(56) References Cited

U.S. PATENT DOCUMENTS

| | | | |
|---|---|---|---|
| 6,003,581 | A | 12/1999 | Aihara |
| 6,007,660 | A | 12/1999 | Forkert |
| 6,066,594 | A | 5/2000 | Gunn et al. |
| 6,082,778 | A | 7/2000 | Solmsdorf |
| 6,159,327 | A | 12/2000 | Forkert |
| 6,283,188 | B1 | 9/2001 | Maynard et al. |
| 8,603,615 | B2 | 12/2013 | Keller |
| 8,720,951 | B2 * | 5/2014 | Brehm .................... B44F 1/02 283/72 |
| 9,176,473 | B1 * | 11/2015 | Lieberman ........... G06K 15/021 |
| 2005/0035590 | A1 | 2/2005 | Jones et al. |
| 2005/0063027 | A1 | 3/2005 | Durst, Jr. et al. |
| 2005/0132194 | A1 | 6/2005 | Ward |
| 2009/0251749 | A1 * | 10/2009 | O'Boyle ............. G03H 1/0252 359/2 |
| 2012/0127547 | A1 | 5/2012 | Gocho |
| 2016/0096392 | A1 | 4/2016 | Jones et al. |

OTHER PUBLICATIONS

Office Action issued in U.S. Appl. No. 14/877,853, dated Dec. 12, 2017, 13 pages.
Schonenberger, Ivo, "A new dimension in photoprotection: Next generation security features for polycarbonate identity documents," Jun. 2012, Keesing Journal of Documents & Identity, 4 pages.

* cited by examiner

| SETTING | | GHOST (bmp) | SIGNATURE (bmp) | KINEGRAM LASER WRITE | DOB FRONT (tactile) | MICRO-SCRIPT (Text) |
|---|---|---|---|---|---|---|
| LASER | Current: | 27.0 A | 26.3 A | 20.0 A | 32.4 A | 32.0 A |
| | Frequency: | 26,000 Hz | 15,600 Hz | 25,000 Hz | 25,000 Hz | 25,000 Hz |
| | Speed: | 1750 mm/s | 1750 mm/s | 400 mm/s | 1500 mm/s | 2,000 mm/s |

FIG. 8

SYSTEM AND METHOD FOR LASER WRITING

RELATED APPLICATIONS

This application claims the benefit under 35 U.S.C. § 119(e) of U.S. Provisional Patent Application No. 62/060,904, filed on Oct. 7, 2014, and U.S. Provisional Patent Application No. 62/142,315, filed on Apr. 2, 2015, the contents of which are incorporated herein by reference.

TECHNICAL FIELD

This paper generally relates to identification documents.

BACKGROUND

Identification documents are issued by government and non-government entities for identification purposes, and are frequent targets of identity thieves and counterfeiters. Additional security features are desirable to advance security of the identification documents.

SUMMARY

In some implementations, personal data may be embedded in a kinegram of an identification document using a suitable low energy laser without compromising the integrity of the kinegram or the identification document. The personal data can be written in a metalized portion of the kinegram in a high definition, high resolution manner such that the personal data may be read by a human without the use of a text-enhancing viewer device (e.g., magnifying glasses). Additional personal data can be written in a reduced text size (e.g., micro-text) in another metalized portion of the kinegram such that a human must use a text-enhancing viewer device to view the micro-text personal data.

In one aspect, some implementations provide a method to embed a security feature into an identification document for identifying a person holding the identification document. The method includes placing the identification document to receive laser irradiation. A metalized structure is inside the identification document and is coated with metal. The method includes further focusing a laser beam on a portion of the metalized structure, irradiating the portion of the metalized structure such that metal is removed from the portion of the metalized structure at the focus of the laser beam, and creating a spatial pattern in the metalized structure by refocusing the laser beam to irradiate at least one more portion of the metalized layer. The created spatial pattern includes a feature to identify the holder of the identification document.

Some implementations can include one or more of the following features.

For example, in some implementations, the optically variable device (OVD) comprises one of a kinegram, a hologram, an exelgram, or a pixelgram. Focusing the laser beam includes energizing a diode pumped solid state infrared laser. Irradiating the portion of metalized structure includes heating up the portion of metalized layer by virtue of preferential absorption of laser energy within the irradiation wavelength of the laser beam. Creating the spatial pattern includes carving a microtext pattern. Creating the spatial pattern includes carving a letter smaller than 0.025" in font size. Creating the spatial pattern further includes carving textual representation of personally identifiable information of the holder of the identification document. Creating the spatial pattern includes carving a graphic pattern representation. Carving the graphic pattern representation includes creating a biometric representation of the holder of the identification document. The biometric representation includes a representation of a facial portrait, a finger print, a palm print, or a signature. Creating the spatial pattern further comprises scanning the laser beam continuously over an area on the identification document to irradiate portion of the metalized structure. Creating the spatial pattern further includes creating a positive spatial pattern. Creating the spatial pattern further includes creating a negative spatial pattern. Creating the spatial pattern further includes creating a half-tone spatial pattern. Scanning the laser beam is performed at a speed of no less than 250 mm/s. In some cases, creating the spatial pattern precedes laminating the identification document. In some cases, subsequent to creating the spatial pattern, the identification document is laminated. Placing the identification document includes placing the identification document that includes a laminate surface and a substrate. Placing the identification document includes placing the identification document with the metalized structure as a layer located under the laminate surface. Placing the identification document includes placing the identification document with the metalized structure that includes an optically variable device (OVD).

In another aspect, some implementations provide a method to embed a security feature into an identification document identifying a holder of the identification document. The method includes applying a laser beam on a portion of a metalized structure embedded within an identification document. The metalized structure includes an opaque material and is embedded below an external surface of the identification document. The method further includes removing metal from the portion of metalized structure in response to applying the laser beam, and creating a spatial pattern in the metalized structure by applying the laser beam to at least one more portion of the metalized structure. The created spatial pattern includes one or more features that correspond to identification information associated with the holder of the identification document and that are visible from a front side and a rear side of the identification document.

Some implementations can include one or more of the following features.

For example, in some implementations, applying the laser beam includes configuring the laser beam at a lower energy state relative to an energy state of a laser beam configured for a laser engraving operation, and maintaining a structural integrity of layers within the identification document upon applying the laser beam having the lower energy state to the metalized structure. Configuring the laser beam at the lower energy state includes configuring a laser emitting the laser beam at a current of about 20 Amperes and a speed of about 400 mm/s. Removing the metal from the portion of metalized structure in response to applying the laser beam includes heating the portion of the metalized structure using the laser beam absorbed at the portion of the metalized structure, and dewetting the metal from the portion of the metalized structure in response to the heating. The metalized structure is one of a kinegram, a hologram, an exelgram, or a pixelgram. Creating the spatial pattern that includes the one or more features corresponding to the identification information associated with the holder of the identification document includes carving a first feature including micro alphanumeric characters that are visible through an enhanced viewing apparatus and are not visible without using the enhanced viewing apparatus, and carving a second feature including alphanumeric characters that are visible with or without the enhanced viewing apparatus. A size of the second feature is larger that a size of the first feature. The second feature is formed at a different location in the metalized structure than a location of the first feature in the metalized structure. The one or more features are visible upon transmission of a radiation wave through the one or more features. The one or more features are not visible without transmission of a radiation wave through the one or more features. The radiation wave is a light wave transmitted from a light source. The spatial pattern corresponds to one or more gaps in the metalized structure.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 8 tabulates exemplary settings for laser operations on different portions of an ID document.

Like reference symbols in the various drawings indicate like elements.

DETAILED DESCRIPTION

Figure 1:
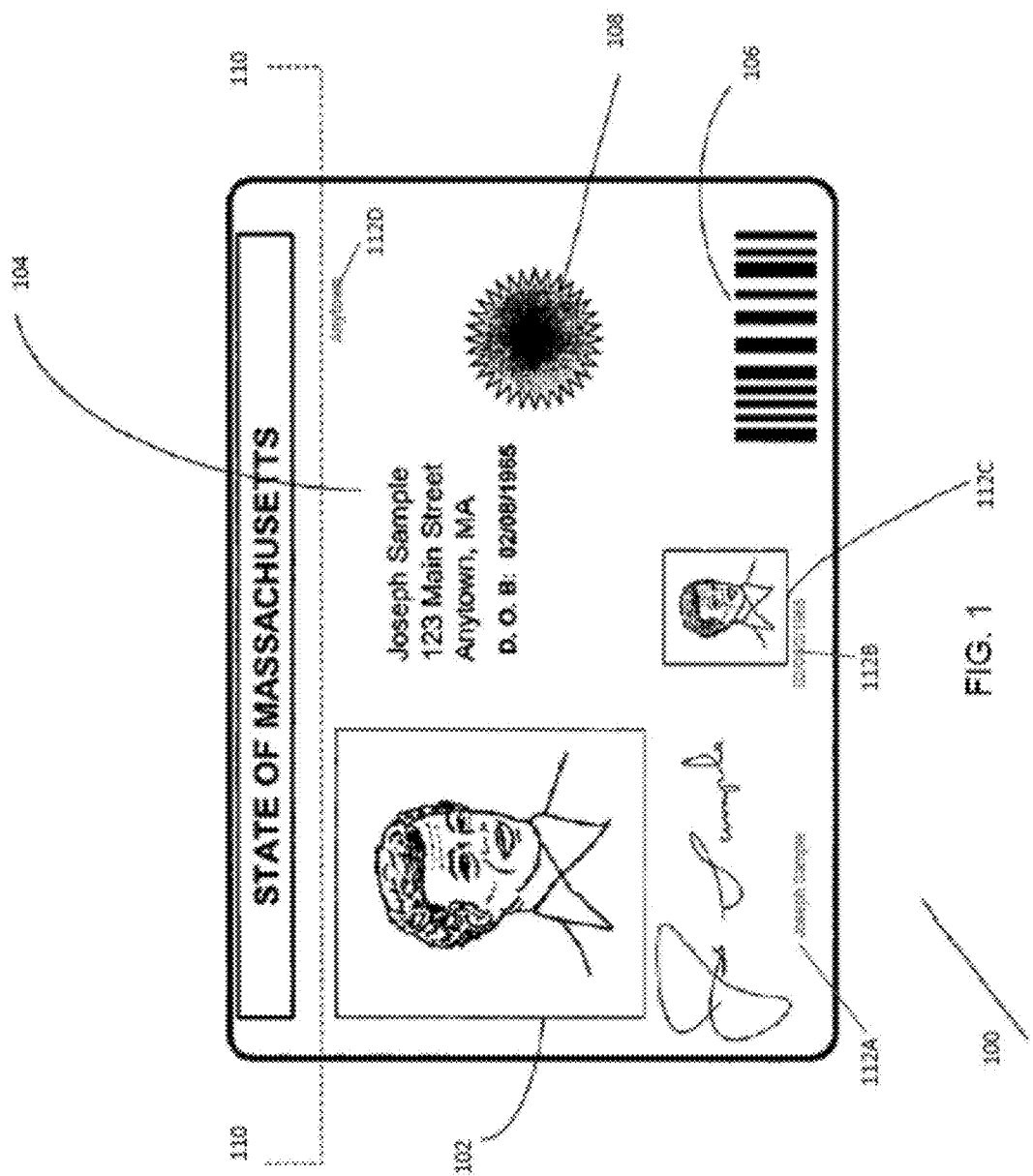
FIG. 1 illustrates an example identification card with security features.
Figure 2:
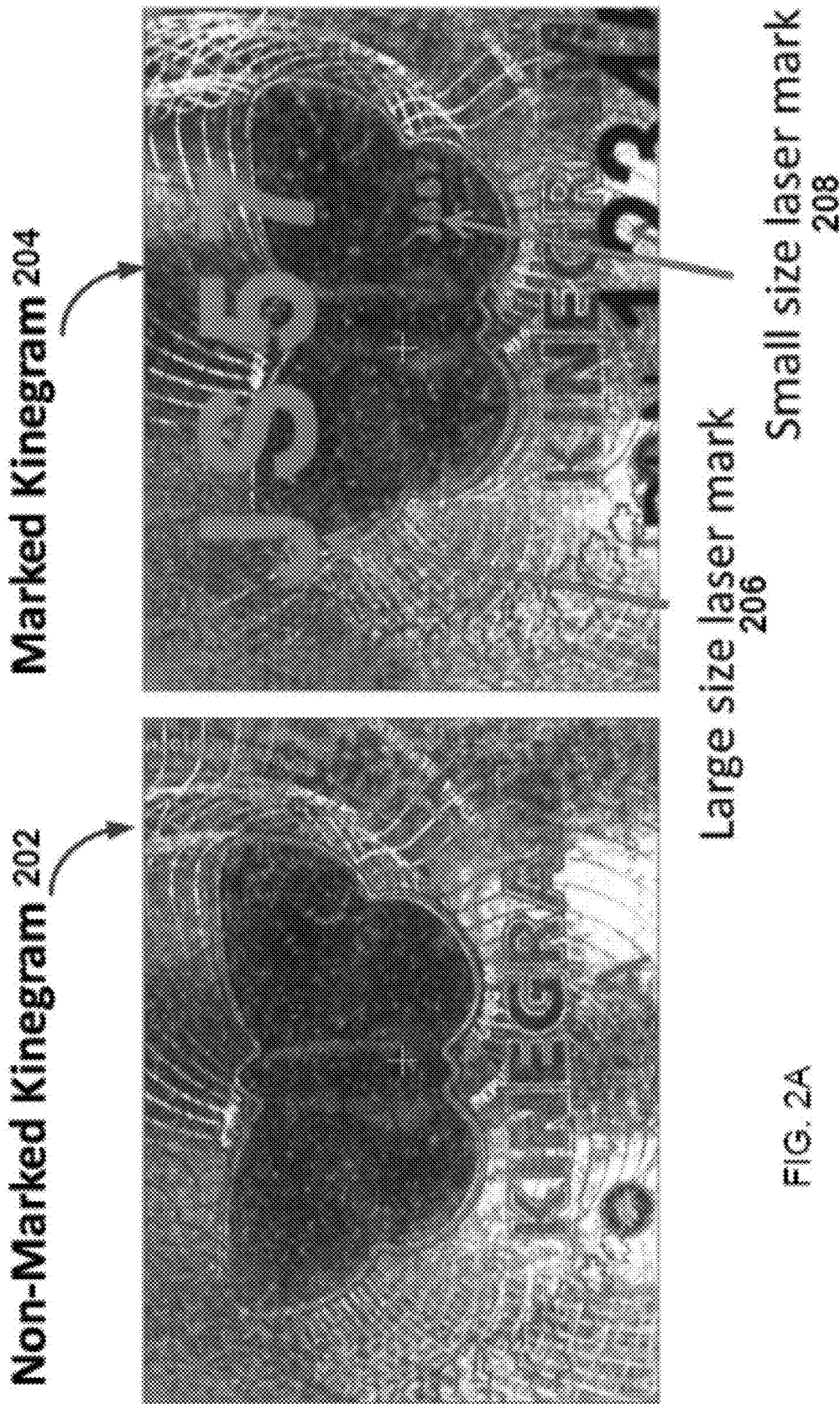
FIGS. 2A-2B show an identification document before and after an example kinegram feature is embedded.

Identification documents, such as driver's licenses or passports, are frequently used to back up identity assertions of document holders. These identification documents may be used for various reasons including, for example, age verification, proving driving privileges, accessing a secure area, and conducting bank or financial transactions. To deter deleterious acts involving fraud and counterfeit mechanisms, security features can be embedded into identification documents. The security features on the identification documents can provide authorities and card holders with a sense of security to preserve, for example, the trust in the asserted identity. Since a large number of transactions may rely on the authenticity of identification documents, the security features on the identification documents can become paramount to support an identification document as a genuine and up-to-date identity proof.

Unlike currencies that are also in wide use by the populace, identification documents are unique to the particular document holder. Therefore, the security features on identification documents can incorporate personalization element to attest to ownership and further heighten the difficulty for counterfeiting and forgery. Implementations disclosed herein incorporate laser-written security features underneath the surface of an identification document. Some implementations may embed personally identifiable information (PII) in the laser-written features. Some implementations may provide biometric representations in the laser-written features. In some instances, the PII or the biometric representation can be embedded into a metalized holographic image underneath the surface of the identification document.

Identification documents ("ID documents") may include, for example, credit cards, bank cards, phone cards, passports, driver's licenses, network access cards, employee badges, debit cards, security cards, visas, immigration documentation, national ID cards, citizenship cards, permanent resident cards (e.g., green cards), medicare cards, medicaid cards, social security cards, security badges, certificates, identification cards or documents, voter registration cards, police ID cards, border crossing cards, legal instruments, security clearance badges and cards, gun permits, gift certificates or cards, and membership cards or badges. The terms "document," "card," "badge," and "documentation" are used interchangeably throughout this patent application.

Many types of identification cards and documents, such as driving licenses, national or government identification cards, bank cards, credit cards, controlled access cards and smart cards, include certain items of information which relate to the identity of the card or document bearer. Examples of such information include name, address, birth date, signature and photographic image. The cards or documents may also carry other variant data (e.g., data specific to a particular card or document, for example an employee number) and invariant data (i.e., data common to a large number of cards, for example the name of an employer). All of the cards described above will hereinafter be generically referred to as "ID documents."

FIG. 1 illustrates an example identification document 100 including a photo 102 of the card holder. ID document 100 also includes a PII area 104, machine-readable zone (MRZ) 106, security feature 108, and labelling information area 110. ID document 100 may also include ghost features 112A-112D to encode, for example, portions of PII or a biometric of the card holder.

In more detail, ID document 100 can be formed using any suitable core material including, for example, polyvinyl chloride (PVC), TESLIN®, or polycarbonate (PC). The ID document 100 may have one or more layers formed using various suitable materials. Photo 102 may include a facial portrait of the card holder. Photo 102 may be a color image, or a monochromatic image. ID document 102 may include ghost photo 112C, which can be a screened-back or "Ghost" version of photo 102. In some implementations, the ghost can be a color or grayscale halftone version of photo 102. Ghost photo 102 may also preferably visible under normal viewing conditions. In some implementations, ID document 100 may include a covert image (not shown) that may correspond to photo 102 and is not visible under ambient viewing conditions. In some implementations, ID document 100 may include an optically-variable photo. Labelling information 110 generally encodes fixed information that does not change for a particular group of card holders. For example, the fixed information may include jurisdictional information or employer information to show the issuing authority. In some implementations, the fixed information may include the name of a corporation, business, or state that is associated with the issuing authority.

PII area 104 shows one or more of the name, residential address, and date of birth of the card holder. In some implementations, the PII area 104 may include an employee ID number, a membership ID number, or other personal data associated with the card holder. "Personalization," "Personalized data," and "variable" data are used interchangeably herein, and refer at least to data, characters, symbols, codes, graphics, images, and other information or marking, whether human-readable or machine-readable, that is (or can be) "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some implementations, personal/variable data can include some fixed data, as well.

For example, in some implementations, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads. Personalized and/or fixed data is also intended to refer to information that is (or can be) cross-linked to other information on the identification document or to the identification document's issuer. For example, personalized data may include a lot number, inventory control number, manufacturing production number, serial number, digital signature, etc. Such personalized or fixed data can, for example, indicate the lot or batch of material that was used to make the identification document, what operator and/or manufacturing station made the identification document and when, etc. Further details about such personalized data on identification cards may be found in the following commonly assigned patent applications, each of which is incorporated by reference: "Inventory Management System and Methods for Secure Document Issuance," 60/529,847, filed Dec. 15, 2003, and counterpart non-provisional application of the same title by Gyi, Kaylor and Dong, filed on Dec. 15, 2004, Ser. No. 10/848,526; "Uniquely Linking Security Elements in Identification Documents," Ser. No. 60/488,536, filed Jul. 17, 2003, and non-provisional counter-part Ser. No. 10/893,149; and "Protection of Identification Documents Using Open Cryptography," Ser. No. 10/734,614, filed Dec. 12, 2003.

Machine-readable zone (MRZ) 106 shows a machine-readable code encoding, for example, information correlating with the PII. In one example, the machine-readable code may include only the name or portions of the name (e.g., the first name, the last name, or the first three letters of the last name) of the holder. In another example, the machine-readable code may include a numerical string encoding portions of the data of birth. In yet another example, the machine-readable code may include portions of the residential address. In all these examples, the portions of the PII as encoded in the machine-readable code can be correlated with the printed PII, as shown in area 104. By way of illustration, ghost features 112A-112D are included to encode, for example, portions of PII and a biometric representation of the card holder. For example, the name information is encoded in ghost feature 112A, the date of birth information in 112B, facial portrait in 112C, and residential address information in 112D.

Security feature 108 may include a KINEGRAM®, hologram, optically-variable device (OVD), diffractive OVDs, ultraviolet (UV) or infrared (IR) indicia, etc. PII may be embedded in the security feature 108 using a laser engraving and/or laser writing process. For example, laser engraving and laser writing may be used individually or in combination to generate one or more parts of the security feature 108. In some cases, one portion of the security feature 108 may be implemented using laser engraving, and another portion of the security feature 108 may be implemented using laser writing. The laser-engraved portions and laser-written portions of the security feature 108 may be located at different parts of the security feature 108 or may overlap each other, at least partially. White writing, black writing, and different shades of gray may be implemented using laser engraving, laser writing, and/or a combination thereof.

FIGS. 2A to 10 describe implementations associated with exemplary laser writing processes. Some implementations provide laser-written security feature 108 to embed a biometric representation of the card holder, such as a facial portrait, a finger-print. In some instances, the laser writing can cause the biometric representation to be carved into metalized holographic images of security feature 108.

In some examples, a personalized security feature can be created in the metalized holographic images by laser writing technologies. FIG. 2A shows an example KINEGRAM® feature 202 with no markings. The KINEGRAM® feature 202 may be included in security feature 108 on ID document 100. KINEGRAM® feature 202 may include a metalized holographic image. A metalized holographic image may be coated with metal or made of metal, such as aluminum. In general, various suitable metals that can absorb laser irradiation at the desired wavelengths (e.g., infrared wavelengths) can be used. Other security features may also be used, for example, an Exelgram, a Pixelgram. The security feature 108 may also include an OVD, a diffractive OVD, optical storage media, a three-dimensional bar code, a two-dimensional bar code, a magnetic stripe, or a chip.

FIG. 2B shows an example KINEGRAM® feature 204 with markings. In this example, two marks are demonstrated, namely large size laser mark 206 and small size laser mark 208. Both marks 206 and 208 encode the same alphanumerical string of "JS57," demonstrating the capability to carve both letters and numerals into the KINEGRAM® by obliterating the metalized structure present in the same location. This carving capability creates a pattern in the KINEGRAM®. In some implementations, the carved textual information can encode highly personalized information such as portions of PII (similar to portions 112A, 112B, and 112D on ID document 100) in the KINEGRAM®. Notably, these implementations encode portions of PII directly within, for example, the holographic structure of the KINEGRAM® itself, rather than printing such portions of PII on top of the holographic structure of the KINEGRAM®.

For the marks shown in FIG. 2B, laser writing was employed to carve the alphanumerical strings. The laser writing process may employ a pulsed Neodymium-doped Yttrium Aluminum Garnet (Nd-YAG) laser to irradiate the metalized holographic structure in the KINEGRAM®. The Nd-YAG laser may include a diode pumped solid state laser. In particular, the pulsed Nd-YAG laser may be focused at one dot of the metalized holographic structure to obliterate the dot. The pulsed Nd-YAG laser may be scanned, for example, in a zig-zig fashion to traverse a region to carve marks 206 and 208 in the metalized holographic structure. The traversal speed may be referred to as the scanning speed. The pulsed Nd-YAG laser may include a Q-Switch laser.

Figure 3:
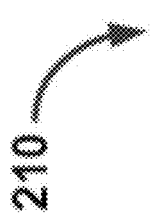
FIG. 3 tabulates example letter sizes and example operational parameters of a laser instrumentation for generating the example kinegram feature of FIG. 2B.
Figure 4:
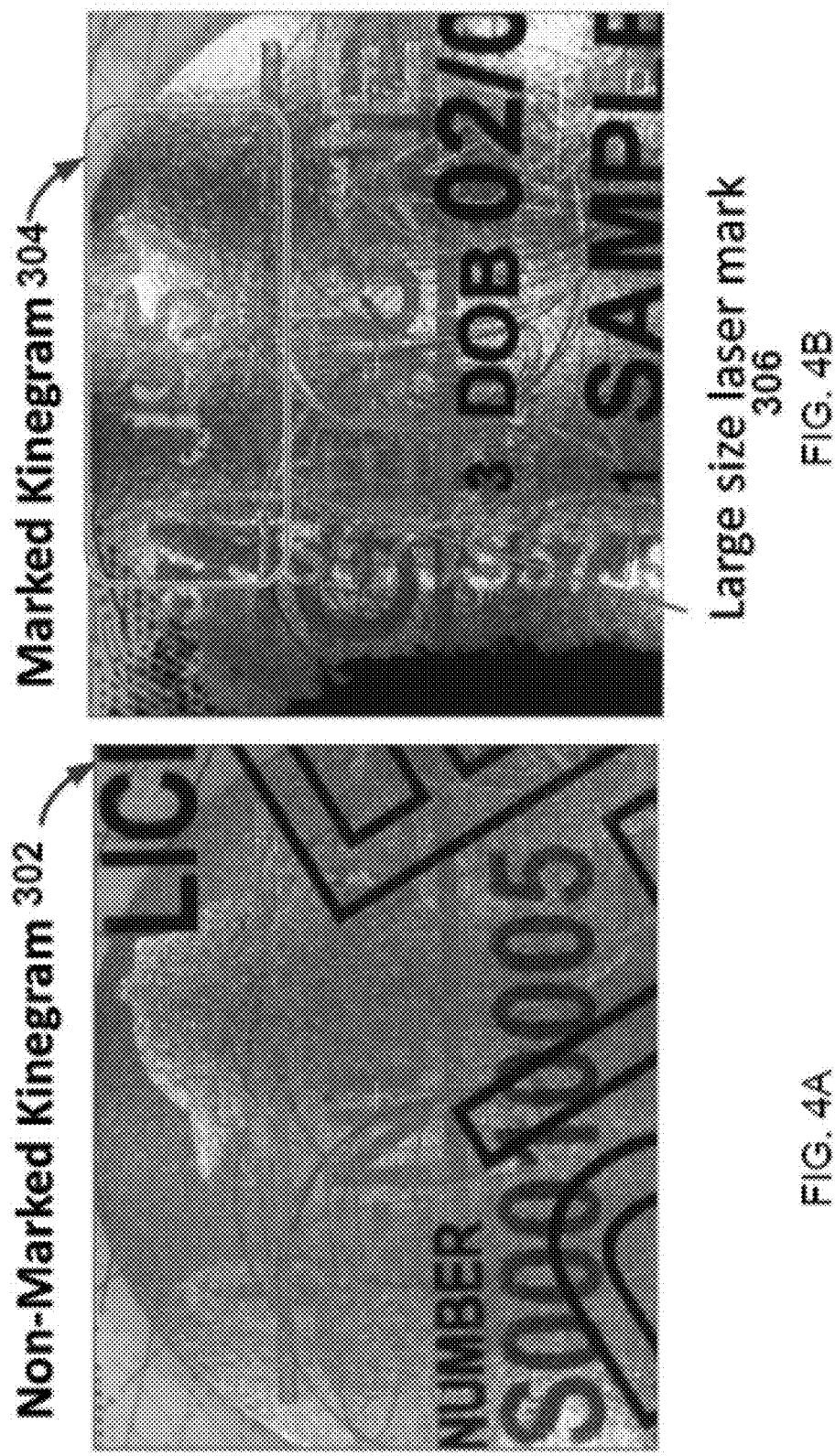
FIGS. 4A-4B show an identification document before and after another example kinegram feature is marked by laser writing.

FIG. 3 tabulates example letter sizes and example operational parameters of the pulsed Nd-YAG laser instrumentation for generating the example kinegram feature of FIG. 2B. As shown in the top row of the table in FIG. 3, the letter size for large mark 206 is 0.10" by 0.12". The operating parameters for the pulsed Nd-YAG laser include: driving current at 20.5 Amperes (A), pulsing frequency at 15 KHz, and scanning speed at 250 mm/s. As shown in the bottom row of the table in FIG. 3, the letter size for small mark 206 is 0.02" by 0.025". The operating parameters for the pulsed Nd-YAG laser include: driving current at 24.0 A, pulsing frequency at 15 KHz, and scanning speed at 700 mm/s. Notably, some implementations can carve microtext into the holographic structure. Microtext refers to font sizes on the order of, for example, $1/100^{th}$ of an inch high that is usually observable under magnifying glasses. It should be understood that the operating parameters of the pulsed Nd-YAG laser to implement the small and large mark as shown in FIG. 3 are exemplary, and that other suitable variations of the operating parameters may be utilized to implement the small and large mark.

In some examples, personalized security feature can be created in the metalized holographic images using an embedded biometric representation. FIG. 4A shows a non-marked KINEGRAM® 302 on an ID document. FIG. 4B shows the ID document with marked KINEGRAM® 304 after laser writing. A rectangular box representation is carved around an earlier generated alphanumerical string "JS57" of a large size laser mark 306. Similar to examples in FIG. 2B, rectangular box is carved into the holographic structure of the KINEGRAM® itself, rather than printed on top of the holographic structure of the KINEGRAM®. The ability to embed a rectangular box with rounded corners demonstrates the feasibility to embed a programmed mark into the holographic structure of the KINEGRAM®. In some cases, an image of a finger-print or palm-print of the card holder may be implemented into the metalized structure of the holographic images. In some cases, a portion of the holder's facial portrait may be implemented into the metalized structure of the holographic images. The images or facial-portrait portions may include one or more of positive, negative, or half-tone spatial patterns.

Figure 5:
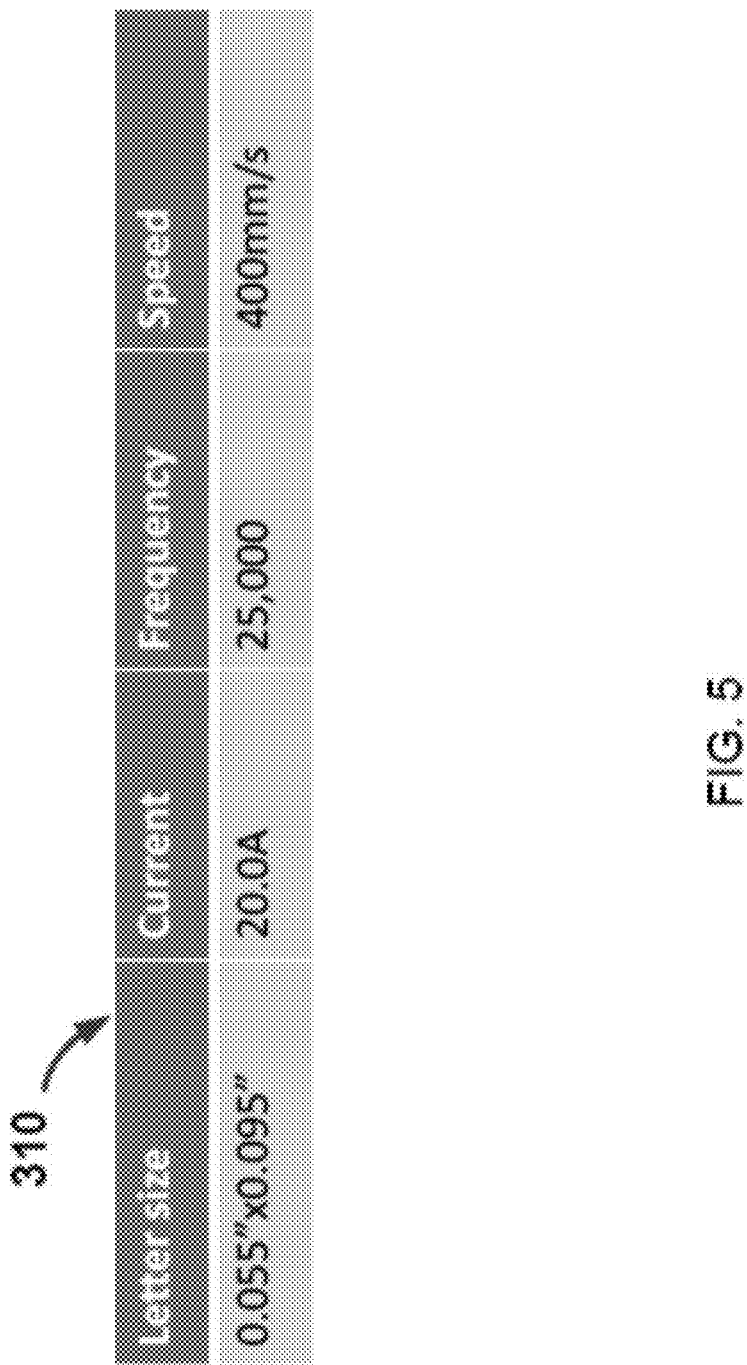
FIG. 5 tabulates example dimensions and example operational parameters of a laser instrumentation for generating the example kinegram feature of FIG. 4B.

As noted above, the laser writing process may employ a pulsed Nd-YAG laser to irradiate the metalized holographic structure in the KINEGRAM®. In particular, the pulsed Nd-YAG laser may be focused at one dot of the metalized holographic structure to obliterate the metalized structure at the dot. The pulsed Nd-YAG laser may be scanned, for example, in a zig-zig fashion to traverse a region to carve marks 206 and 208. The traversal speed may be referred to as the scanning speed. The pulsed Nd-YAG laser may include a Q-Switch laser. FIG. 5 tabulates example dimensions and example operational parameters of a laser instrumentation for generating the example KINEGRAM® feature of FIG. 4B. According to FIG. 5, the letter size of the rectangular box is "0.055" by "0.095." The current driving the Nd-YAG laser is 20.0 A, pulsing frequency of the Nd-YAG laser is 25 KHz, and the scanning speed is 400 mm/s. It should be understood that the operating parameters of the pulsed Nd-YAG laser shown in FIG. 5 are exemplary, and that other suitable variations of the operating parameters may be utilized.

Figure 6A:
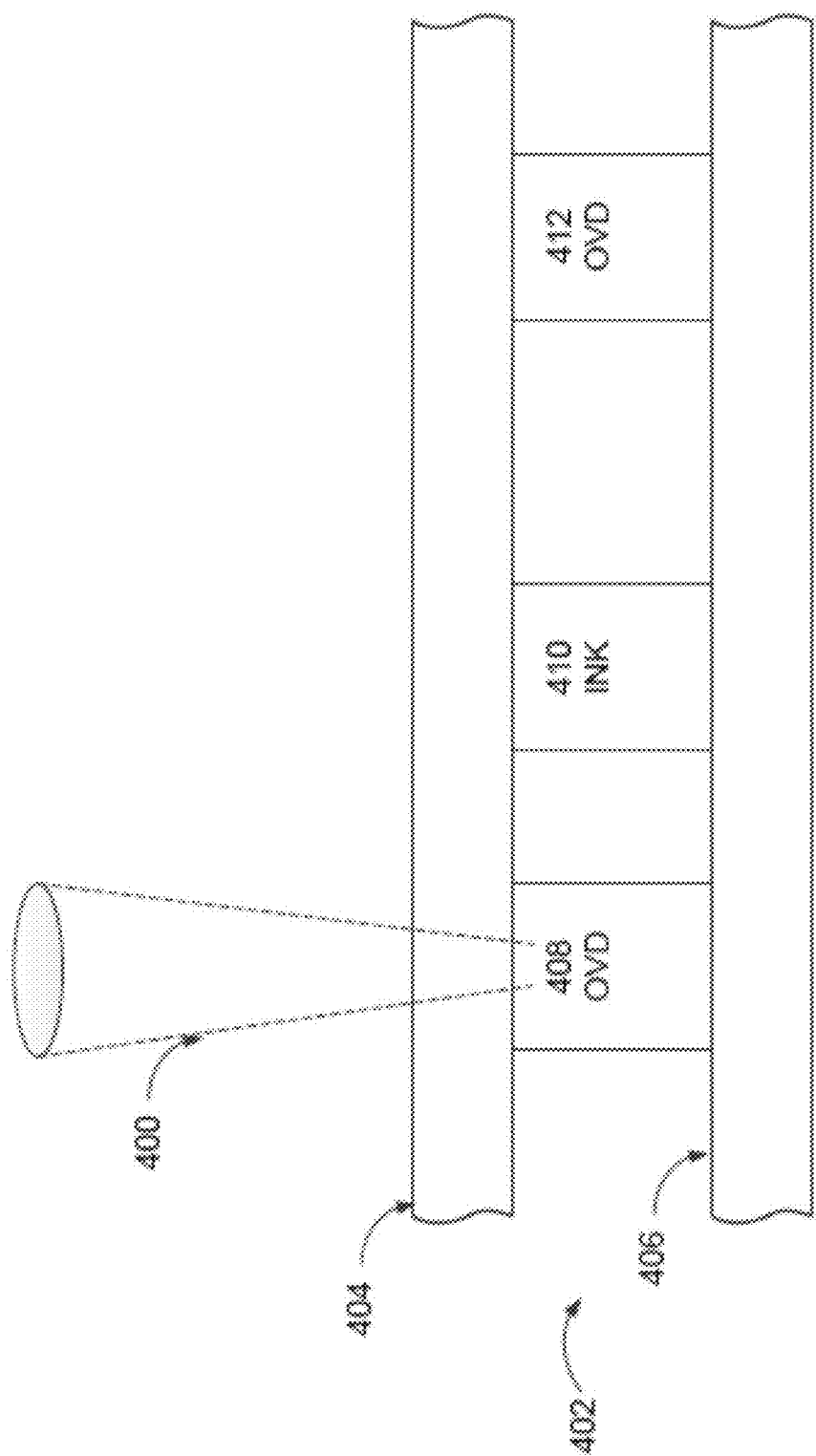
FIGS. 6A and 6B illustrate cross-sectional views example configurations for laser writing.
Figure 6B:
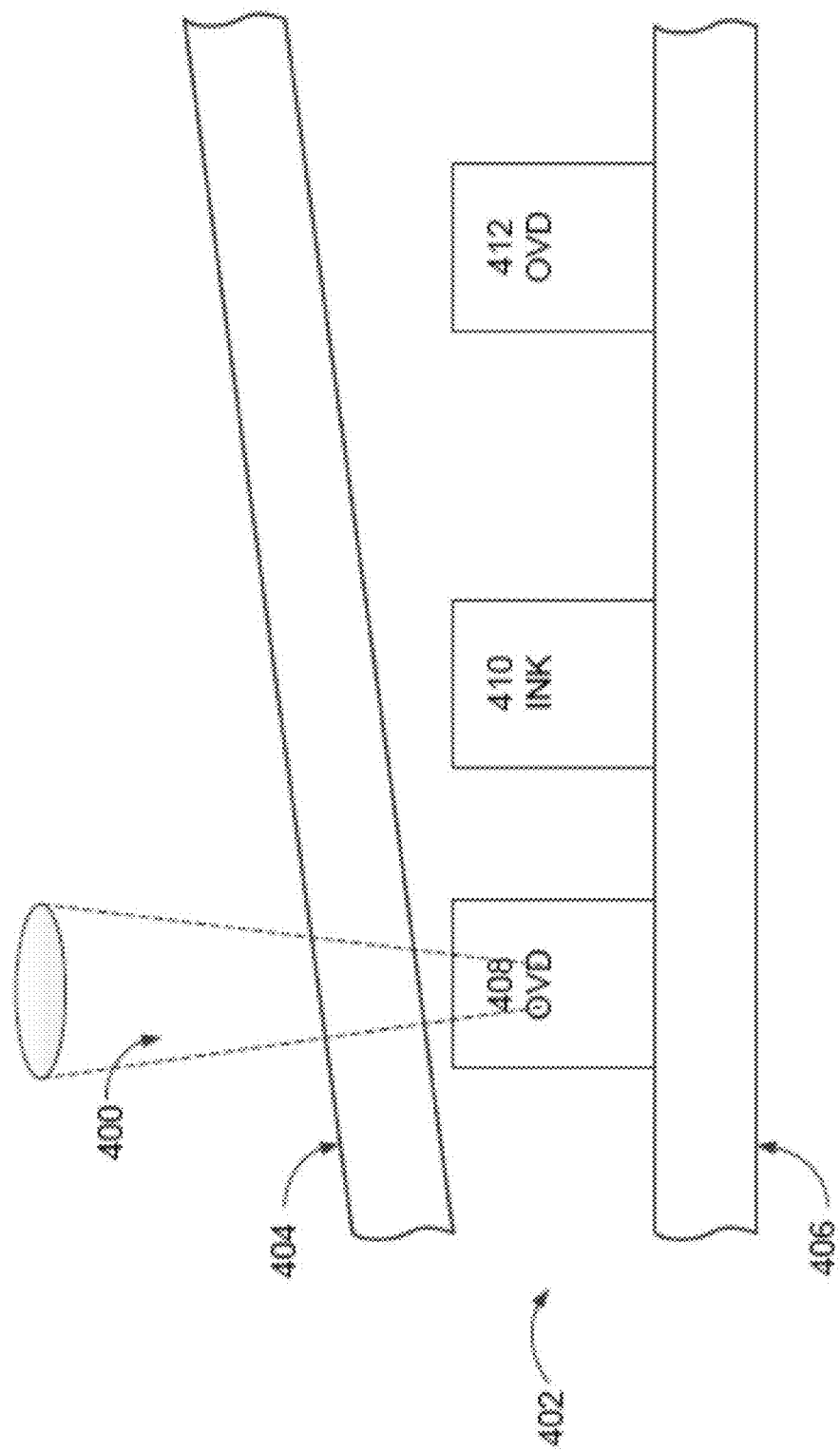

FIGS. 6A and 6B illustrate cross-sectional views example configurations for laser writing. FIG. 6A shows an ID document 602 with surface 404 and substrate 406. Surface 404 and substrate 406 may be substantially parallel. Surface 404 may be transparent while substrate 406 may be opaque. Optical variable devices (OVDs) 408 and 412 are located between surface 404 and substrate 406. In some implementations, OVD 408 and 412 may include a Kinegram, an Exelgram, a Pixelgram. Ink 410 is also sandwiched between surface 404 and substrate 406. The ink region corresponds to areas where printed information is presented on the ID document 402.

The OVDs 408 and 412 and ink 410 may be disposed at various suitable locations between the surface 404 and substrate 406. For example, the OVDs 408 and 412 may be disposed at any location between the surface 404 and substrate 406 corresponding to a location of a security feature 108.

In FIGS. 6A and 6B, a laser beam 400 is focused on a spot of OVD 408 through a lens structure. At the focal point, laser irradiation may cause a preferential absorption of laser energy by, for example, the metalized holographic structure. The absorption may give rise to a sharp and rapid temperature elevation that obliterates the metalized structure. As the metalized structure at the focal spot is obliterated, a corresponding void may be created in the underlying hologram. Laser beam 400 may be translated to a different spot of OVD 408. In some instances, the translation may be by virtue of scanning in a continuous motion that irradiates the metalized structure underneath the path. In other instances, laser beam 400 may be turned off, and a motorized structure may cause the laser beam 400 to be translated to the different spot when it is turned on again. In the above instances, the irradiation pattern may be programmed and the focal point of laser beam 400 may traverse a path on the metalized holographic structure. The traversal can be performed at a scanning speed to carve the intended pattern into the hologram of OVD 408. As tabulated in FIGS. 3 and 5, scanning may be performed expeditiously so that large numbers of ID documents can be processed. Programming of the irradiation patterns for large number of ID documents may be implemented such that some of the programming is common to all of the ID documents and other parts of the programming are specific to a particular ID document.

In some implementations, laser writing may be performed before the surface 402 is laminated. As illustrated in FIG. 6B, laser beam 400 may be focused on the spot on OVD 408 when surface 404 has not been laminated, for example, when surface 404 is at a slanted angle with respect to substrate 406. In other instances, surface 404 may be absent and laser beam 400 may be focused on the spot on OVD 408. In these instances, the irradiation pattern may be programmed and the focal point of laser beam 400 may traverse a path on the metalized holographic structure of OVD 408. The traversal may cause the intended pattern to be carved into the hologram of OVD 408. The pattern may correspond to portions of the PII or a biometric representation of the holder. After the pattern has been created, ID document 402 may be laminated so that surface 402 is placed on the top surface to seal OVDs 408 and 412, ink 410, as well as the newly carved pattern.

Figure 7B:
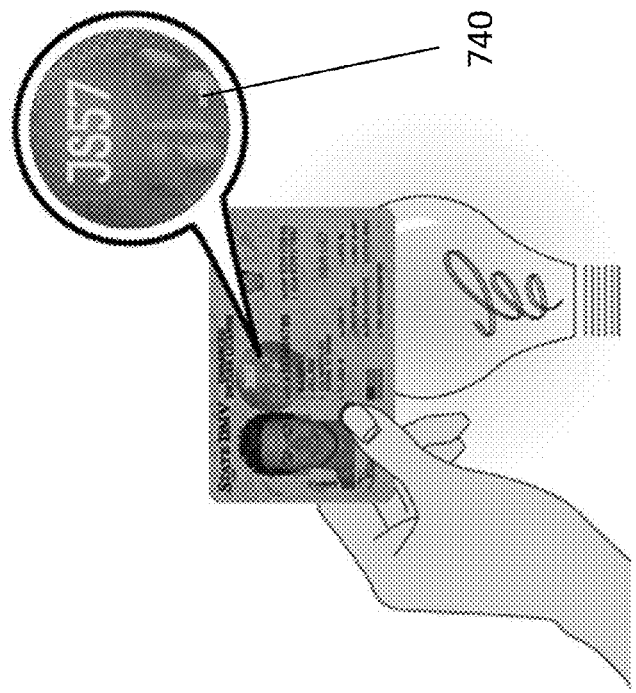
FIGS. 7A and 7B illustrate examples of an identification document with personal data laser-written into a metallized diffractive optical variable device or hologram.
Figure 7A:
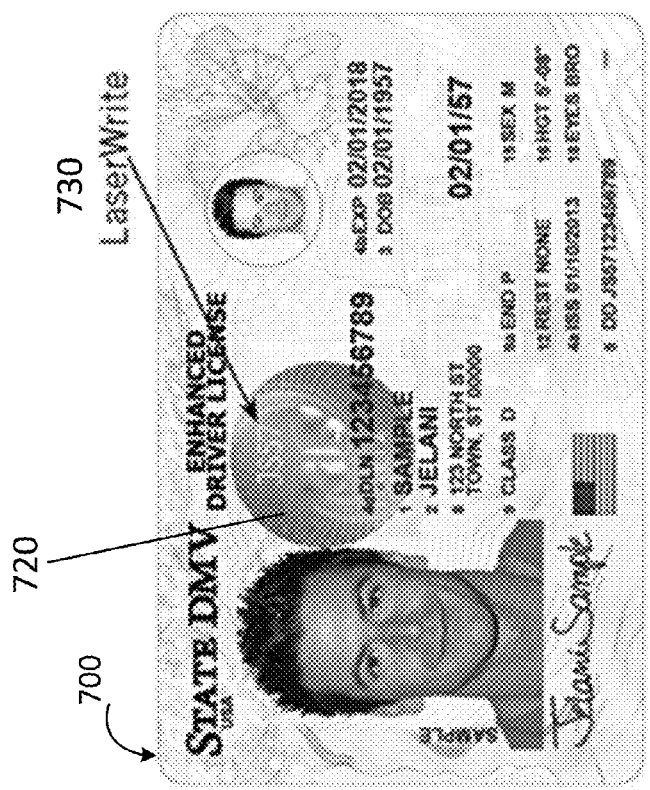

FIGS. 7A and 7B illustrate examples of an ID document 700 with personal data 730 (e.g., "J557") laser-written into a metallized hologram or KINEGRAM® 720. As described above, the personal data may include PII in the form of alpha numeric characters, images, and various other suitable images and designs. The personal data is highly-defined, visible from the front and back side of the ID document 700, and is viewable under reflected light or light projected from a light source, as shown in FIG. 7B. The metallized hologram or KINEGRAM® 720 may also include micro-text 740. In some cases, the micro-text 740 may be a duplication of the personal data 730 provided in a larger font. In general, the micro-text 740 may be any PII data associated with a person identified by the ID document 700. Micro-text 740 may not be visible to a person without the use of a text-enhancing viewer device (e.g., magnifier). In some cases, when a light is projected from a light source, the micro-text 740 may be apparent but is not legible to a viewer without the use of a text-enhancing viewer device.

To embed PII into a security feature 108, a clean room area and/or adhesive type contact cleaners may be used to minimize metal chip and dust contamination during operations. The operations include hot stamping a metalized hologram or KINEGRAM® within a polycarbonate (PC) substrate (body of ID document 700). The metallized hologram or KINEGRAM® may be formed of an opaque metal with a high refractive index. In general, various suitable high refractive index materials such as, for example, indium tin oxide, may be used to form the metalized hologram or KINEGRAM®. The hot stamped metalized hologram or KINEGRAM® is inserted into the ID document 700 under a sensitized PC layer. Laser writing is then performed using a low-power setting for a YAG laser to embed the PII into the metalized hologram or KINEGRAM®. For instance, laser emitted from the YAG laser is absorbed by the metalized hologram or KINEGRAM® and causes the metal with the absorbed radiation to be removed from the hologram or KINEGRAM®.

In some implementations, the laser is moved along a path or pattern to implement the laser-written personal data 730 (e.g., "JS57"). In some implementations, the ID document 700 including the sensitized PC layer and metalized hologram or KINEGRAM® are moved while the laser remains stationary to implement the laser-written personal data 730.

Exemplary YAG laser settings for performing laser writing on different portions of an ID document are shown in FIG. 8. For example, table 800 illustrates the current, frequency, and speed of a laser for implementing different portions of an ID document 700 such as a ghost image, a signature image, a KINEGRAM®, a date of birth (DOB) text, and a microscript text (e.g., micro-text). As shown in FIG. 8, the laser settings for a ghost image are 27 A current, 25 KHz frequency, and a speed of 1,750 mm/s. The laser settings for a signature image are 26.3 A current, 15.6 KHz frequency, and a speed of 1,750 mm/s. The laser settings for a KINEGRAM® are 20 A current, 25 KHz frequency, and a speed of 400 mm/s. The laser settings for DOB text are 32.4 A current, 25 KHz frequency, and a speed of 1,500 mm/s. The laser settings for a microscript text are 32 A current, 25 KHz frequency, a speed of 2,000 mm/s.

As can be appreciated from FIG. 8, the driving current and scan speed for performing laser writing in the metalized hologram or KINEGRAM® are substantially lower than the current and scan speed for the YAG laser associated with performing laser engraving and writing operations at other portions of the ID document 700. In some cases, the YAG laser performing a laser writing operation in the metalized hologram or KINEGRAM® is configured to use 10-20% of the energy used for laser engraving operations in layers above the metalized hologram or KINEGRAM®. The low-power setting of the YAG laser helps maintain the integrity of the ID document 700 such that sensitized layers within the ID document 700 are not marked or activated. Because the quality of laser-writing is very high with highly-defined edges and the integrity of other layers of the ID document 700 are not compromised, high definition PII can be embedded into the metalized hologram or KINEGRAM®. This high definition characteristic also provides the capability to embed micro-text 740. It should be understood that although FIG. 8 provides some exemplary YAG laser settings, other suitable low power settings for the YAG laser may also be used.

Figure 9:
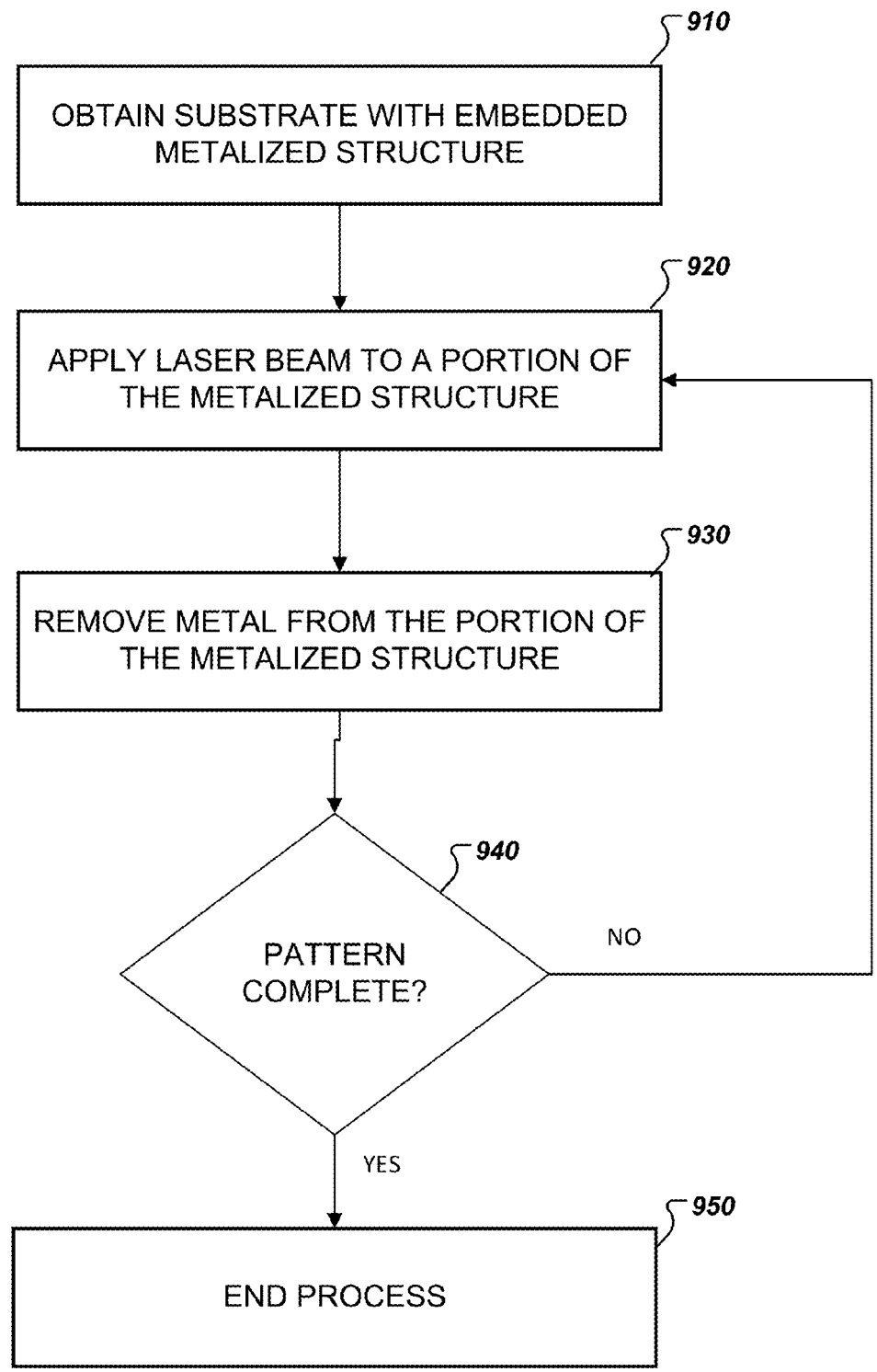
FIG. 9 illustrates an example process for performing laser writing of security features in an identification document.

A flowchart for an example method to perform laser writing of security features in an ID document is shown in FIG. 9.

The method may begin with obtaining an identification document substrate with an embedded metalized structure in the substrate (910). For example, as described above, the identification document substrate may include a core material such as, for example, polyvinyl chloride (PVC), TESLIN®, or polycarbonate (PC). A transparent, opaque surface layer may be disposed on the core material. A metallized structure may be disposed between the surface layer and the core material. The metallized structure may include one or more of a KINEGRAM®, a hologram, an exelgram, or a pixelgram. Other components and elements, such as ink, may also be provided in the identification document substrate.

Next, a laser beam may be applied to a portion of the metalized structure (920). The laser beam may be focused at one dot of a metalized holographic structure in the identification document substrate to obliterate the dot. In general, any suitable laser, such as Nd-YAG or YAG lasers, may be used to emit the laser beam. Exemplary parameters for the laser have been provided in FIGS. 3, 5, and 8. The parameters of the laser and laser beam may be configured based on the type of laser writing to be implemented. For instance, to implement white laser writing, the laser may be configured to generate a low energy laser beam so that the integrity of certain layers (e.g., core, surface, etc.) in the identification document substrate is not compromised and these layers are not marked or activated. In some instances, other types of laser writing operations (e.g., black writing) may require higher energy laser beams. Accordingly, the power level of the laser beam can be configured based on the desired laser writing operation.

The laser beam may be applied using various suitable laser and optical instruments. For example, the laser beam may be propagated and controlled using any suitable combination of lens and/or mirrors. In some implementations, lenses made of fused silica may be used for facilitating transmission of the laser beam due to the low absorption and high transmission of fused silica-based lenses. In some implementations, a bi-convex or plano-convex lens may be used to focus the laser beam on a particular portion of the metalized structure.

To apply the laser beam to an identification document substrate, the laser may be programmed to implement a particular pattern on the identification document substrate. The particular pattern to implement on the identification document substrate may include, for example, one or more features corresponding to personalized data associated with a holder of the identification document. In some implementations, the one or more features may include one or more patterns reflecting a portion, symbol, alphanumeric characters, or representations associated with personalized data. As described above, personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate).

Programming of the laser to implement a particular program may be accomplished using various suitable combinations of hardware and software. Further, implementation of the programming may be performed through various suitable methods. For example, in some cases, a laser may be programmed to move or redirect the laser beam from one spatial location to another to implement a path according to the particular pattern. In some cases, the laser may be stationary and a platform on which the identification document substrate rests is controlled to move in a manner such that the laser beam can implement the particular pattern on the identification document substrate.

Referring back to FIG. 9, after a laser beam is applied to a portion of the metalized structure, metal from the portion of the metalized structure is removed (930). Metal is removed as a result of energy absorbed from the laser beam at the portion of the metallized structure. In particular, energy absorption may give rise to a sharp and rapid temperature elevation that obliterates the metalized structure and results in removal of one or more metallic portions in the metalized structure. As the metalized structure at the focal spot is obliterated, a corresponding void may be created in the underlying hologram. In some cases, for example when implementing white writing, the void created may be observable from both sides of the identification document substrate. In some cases, the void created may be observable from one side of the identification document substrate.

After removing metal from a particular portion of the metalized structure and creating a void, the particular pattern to be implemented on the identification document substrate is checked. For example, a determination is made as to whether additional portions of the metalized structure in the identification document substrate are to be removed. If no additional portions of the metalized structure are to be removed, the laser writing process is complete (950).

However, if one or more additional portions of the metalized structure in the identification document substrate are yet to be removed, the method returns to operation 920 and subsequent operations 930 and 940 are repeated until no additional portions of the metalized structure are to be removed.

Figure 10:
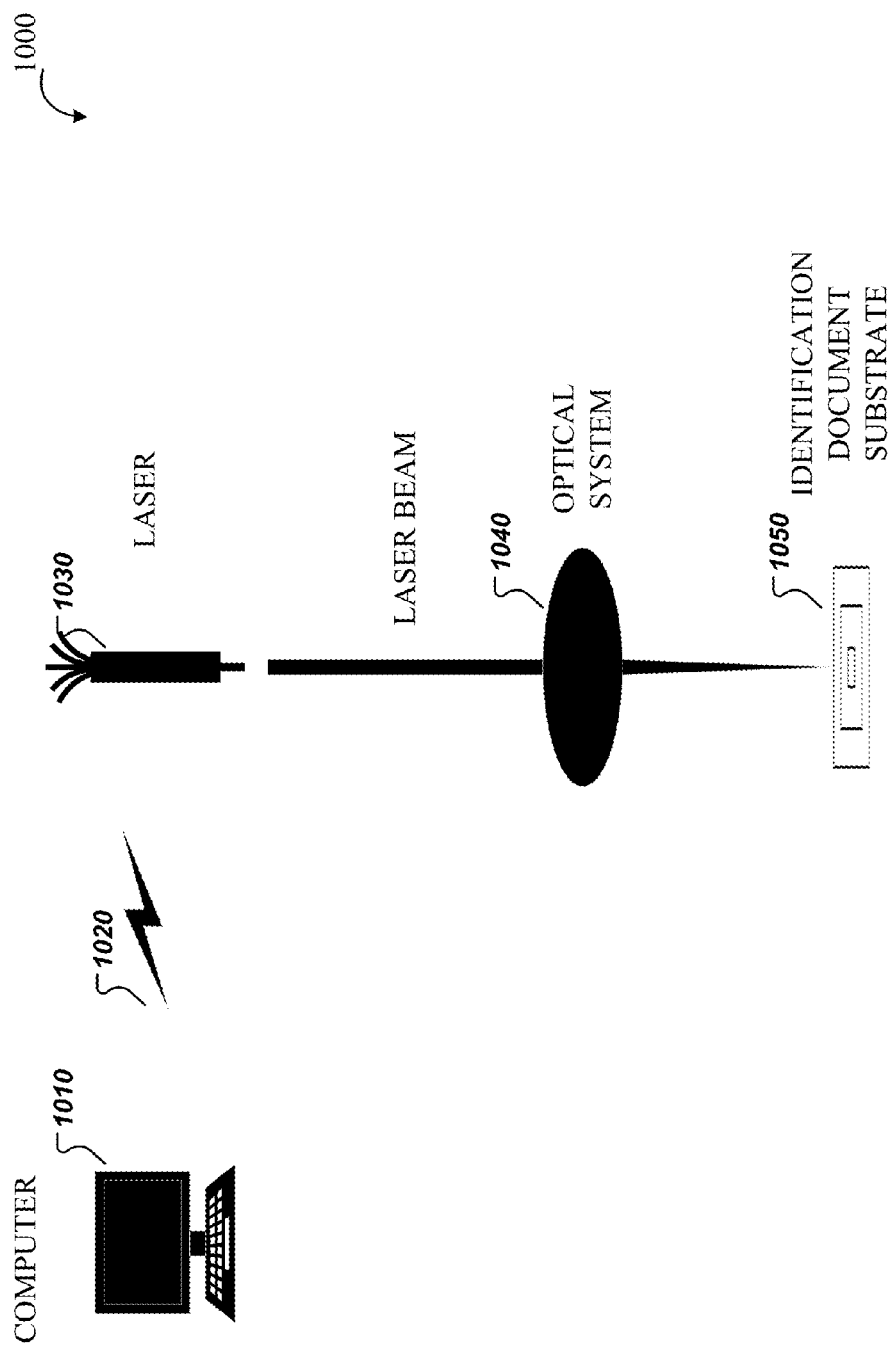
FIG. 10 illustrates an example system for performing laser writing.

FIG. 10 illustrates an example system 1000 for performing laser writing as described hereinabove. The system 1000 may include a computer 1010, a network 1020, a laser 1030, an optical system 1040, and an identification document substrate 1050.

The computer 1010 may be utilized to execute a program for implementing a particular pattern through laser writing on the identification document substrate 1050. The particular pattern may correspond to one or more features corresponding to personalized data associated with a holder that are to be embedded or implemented within the metalized holographic structure in the identification document substrate. Various suitable programs and interfaces may be used to input a particular program and communicate with the laser 1030 through the network 1020. In general, the computer 1010 may be any suitable computer that includes an input unit (e.g., keyboard, mouse), output unit (e.g., display monitor), transceiver to communicate over network 1030, storage units, and one or more processors.

The processors may include any type of processor, microprocessor, or processing logic that may interpret and execute instructions (e.g., a field programmable gate array (FPGA)). Processor may include a single device (e.g., a single core) and/or a group of devices (e.g., multi-core). The storage units may include a random access memory (RAM) or another type of storage device that may store information and instructions for execution by the one or more processors. The storage units may also be used to store temporary variables or other intermediate information during execution of instructions by the one or more processors.

The computer 1010 may execute the program for implementing a particular pattern through laser writing on the identification document substrate 1050 in response to one or more processors executing software instructions contained in a computer-readable medium. Examples of computer-readable medium may include one or more types of non-transitory computer-readable storage media capable of storing electronic data, including volatile memory or non-volatile memory, removable or non-removable memory, erasable or non-erasable memory, and writeable or re-writeable memory, hard drives, disk drives, solid state drives, and any other tangible storage media. In some implementations, hardwired circuitry may be used in place of or in combination with software instructions to implement features consistent with principles of the disclosure. Thus, implementations consistent with principles of the disclosure are not limited to any specific combination of hardware circuitry and software.

Various types of networks 1020 may be used. For example, the network 1020 may include wired or wireless networks, e.g., a local area network (LAN), a wide area network (WAN), implementing one or more network architectures such as Worldwide Interoperability for Microwave Access (WiMAX), Wireless Fidelity (WiFi), a layer 3 virtual private network (VPN), an enterprise IP network, or any combination thereof. In general, the network 1020 may provide network access, data transport and other services to devices, such as the computer 1010 and laser 1030, coupled to the network 1020.

As noted above, laser 1030 may include various suitable lasers, such as a Nd-YAG or YAG laser, to generate a laser beam. In some cases, the laser 1030 may be a diode pumped solid state laser or a Q-Switch laser. Operational parameters of the laser 1030 may be configured by an operator through computer 1010 and communicated to the laser 1030 over network 1020. For example, the timing and output of the laser beam from laser 1030 can be controlled by the computer 1010. Although not shown, in some cases, the laser 1030 may be affixed to a platform that can control precise movement of the laser 1030. If the laser 1030 is to be moved, the platform can be controlled through computer 1010 to move in a particular direction. As described above, a particular pattern can be implemented in the identification document substrate 1050 by moving the laser 1030 through the platform movement.

The laser beam emitted from laser 1030 may be manipulated through optical system 1040 and directed to the identification document substrate 1050. The laser beam may be focused at one dot of a metalized holographic structure in the identification document substrate 1050 to obliterate the dot.

The optical system 1040 may include various suitable laser and optical instruments arranged using any suitable combination of lens and/or mirrors. For instance, fused silica lenses, bi-convex lenses, or plano-convex lens may be used for facilitating transmission of the laser beam.

Arrangements of the laser 1030 and optical system 1040 may be varied depending on the desired operation. For instance, the focal length and lens diameter in the optical system 1040 may be configured based on the desired focal length, depth of focus, and thermal properties. In some cases, a large lens diameter may be utilized to prevent thermal overload. In some cases, the laser beam may be focused more precisely by utilizing a short focal length.

A detailed description of the identification document substrate 1050 for an ID document has been provided above. An example ID document may include a core layer (which can be pre-printed), such as a light-colored, opaque material (e.g., TESLIN (available from PPG Industries) or polyvinyl chloride (PVC) material). The core is laminated with a transparent material, such as clear PVC to form a so-called "card blank". Information, such as variable personal information (e.g., photographic information), is printed on the card blank using a method such as Dye Diffusion Thermal Transfer ("D2T2") printing (described further below and also described in commonly assigned U.S. Pat. No. 6,066,594, which is incorporated herein by reference in its entirety.) The information can, for example, include an indicium or indicia, such as the invariant or non-varying information common to a large number of identification documents, for example the name and logo of the organization issuing the documents. The information may be formed by any known process capable of forming the indicium on the specific core material used.

Although not shown in FIG. 10, in some implementations, the identification document substrate 1050 may be affixed to a sample holder or rest on a table. The sample holder or table may also be controlled by the computer 1010 to move the sample holder or table. The computer 1010 may control the direction, speed, distance, elevation, and other aspects of the movement of the sample holder or table. By moving the sample holder or table to which the identification document substrate 1050 is affixed according to programmed movement, a particular pattern may be implemented on the identification document substrate 1050.

Although one implementation of a laser writing system 1000 has been described herein, variations of the system 1000 may be implemented to execute the method illustrated in FIG. 9 and to implement the various laser writing aspects described in FIGS. 1-8. For instance, adhesive type contact cleaners may be used in the laser writing system 1000 to minimize contamination. Further, the system 1000 may be implemented in a clean room environment.

The laser writing system 1000 can execute laser writing procedures expeditiously so that large numbers of identification (ID) documents can be processed. Programming of the particular patterns for large number of ID documents may be implemented such that some of the programming is common to all of the ID documents and other parts of the programming are specific to a particular ID document.

Commercial systems for issuing ID documents are of two main types, namely so-called "central" issue (CI), and so-called "on-the-spot" or "over-the-counter" (OTC) issue. Both types are applicable to the laser engraving and writing technology as disclosed herein.

CI-type ID documents are not immediately provided to the bearer, but are later issued to the bearer from a central location. For example, in one type of CI environment, a bearer reports to a document station where data is collected, the data is forwarded to a central location where the card is produced, and the card is forwarded to the bearer, often by mail.

Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a driver's license card through the mail.

In contrast, a CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner.).

Centrally-issued identification documents can be produced from digitally stored information and generally include an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents.

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document. This, an OTC card issuing process can be by its nature an intermittent-in comparison to a continuous-process.

OTC identification documents of the types mentioned above can take a number of forms, depending on cost and desired features. Some OTC ID documents include highly plasticized poly(vinyl chloride) or have a composite structure with polyester laminated to 0.5-2.0 mil (13-51 µm) poly(vinyl chloride) film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 µm) overlay patches applied at the printhead, holographic hot stamp foils (0.125-0.250 mil 3-6 µm), or a clear polyester laminate (0.5-10 mil, 13-254 µm)

supporting common security features. These last two types of protective foil or laminate sometimes are applied at a laminating station separate from the printhead. The choice of laminate dictates the degree of durability and security imparted to the system in protecting the image and other data.

The terms "indicium" and indicia as used herein cover not only markings suitable for human reading, but also markings intended for machine reading, and include (but are not limited to) characters, symbols, codes, graphics, images, etc. Especially when intended for machine reading, such an indicium is not be visible to the human eye, but may be in the form of a marking visible only under infrared, ultraviolet or other non-visible radiation. Thus, in at least some implementations, an indicium formed on any layer in an identification document (e.g., the core layer) may be partially or wholly in the form of a marking visible only under non-visible radiation. Markings comprising, for example, a visible "dummy" image superposed over a nonvisible "real" image intended to be machine read may also be used.

"Laminate" and "overlaminate" include (but are not limited to) film and sheet products. Laminates usable with at least some implementations include those which contain substantially transparent polymers and/or substantially transparent adhesives, or which have substantially transparent polymers and/or substantially transparent adhesives as a part of their structure, e.g., as an extruded feature. Examples of usable laminates include at least polyester, polycarbonate, polystyrene, cellulose ester, polyolefin, polysulfone, or polyamide. Laminates can be made using either an amorphous or biaxially oriented polymer as well. The laminate can include a plurality of separate laminate layers, for example a boundary layer and/or a film layer.

The degree of transparency of the laminate can, for example, be dictated by the information contained within the identification document, the particular colors and/or security features used, etc. The thickness of the laminate layers may vary, for example, in some implementations, the thickness of a laminate layer be about 1-20 mils. Lamination of laminate layer(s) to other layer of material (e.g., a core layer) can be accomplished using any conventional lamination process, and such processes are known to those skilled in the production of articles such as identification documents.

For example, in ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. patents is herein incorporated by reference.

The material(s) from which a laminate is made may be transparent. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, this disclosure describes ID document structures (e.g., TESLIN-core, multi-layered ID documents) and fused polycarbonate structures as example structures. The descriptions herein are generally relevant to articles to which a laminate and/or coating is applied, including articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

A number of implementations have been described. Nevertheless, it will be understood that various modifications may be made without departing from the spirit and scope of the subject innovation. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method to embed a security feature into an identification document for identifying a person holding the identification document, the method comprising:
   placing the identification document to receive laser irradiation, wherein a metalized structure is inside the identification document and is coated with metal;
   focusing a laser beam on a portion of the metalized structure;
   irradiating the portion of the metalized structure such that metal is removed from the portion of the metalized structure at the focus of the laser beam; and
   creating a spatial pattern in the metalized structure by refocusing the laser beam to irradiate at least one more portion of the metalized structure, the created spatial pattern including a feature to identify the holder of the identification document.

2. The method of claim 1, wherein the metallized structure comprises one of a kinegram, a hologram, an exelgram, or a pixelgram.

3. The method of claim 1, wherein focusing the laser beam comprises energizing a diode pumped solid state infrared laser.

4. The method of claim 1, wherein irradiating the portion of metalized structure comprises heating up the portion of metalized structure by virtue of preferential absorption of laser energy within the irradiation wavelength of the laser beam.

5. The method of claim 1, wherein creating the spatial pattern comprises carving a microtext pattern.

6. The method of claim 5, wherein creating the spatial pattern comprises carving a letter smaller than 0.025" in font size.

7. The method of claim 5, wherein creating the spatial pattern further comprises carving textual representation of personally identifiable information of the holder of the identification document.

8. The method of claim 1, wherein creating the spatial pattern comprises carving a graphic pattern representation.

9. The method of claim 8, wherein carving the graphic pattern representation comprises creating a biometric representation of the holder of the identification document.

10. The method of claim 9, wherein the biometric representation comprises a representation of a facial portrait, a finger print, a palm print, or a signature.

11. The method of claim 1, wherein creating the spatial pattern further comprises scanning the laser beam continuously over an area on the identification document to irradiate the portion of the metalized structure.

12. The method of claim 11, wherein creating the spatial pattern further comprises creating a positive spatial pattern.

13. The method of claim 11, wherein creating the spatial pattern further comprises creating a negative spatial pattern.

14. The method of claim 11, wherein creating the spatial pattern further comprises: creating a half-tone spatial pattern.

15. The method of claim 11, wherein scanning the laser beam is performed at a speed of no less than 250 mm/s.

16. The method of claim 1, wherein creating the spatial pattern precedes laminating the identification document.

17. The method of claim 16, further comprising:
subsequent to creating the spatial pattern, laminating the identification document.

18. The method of claim 1, wherein placing the identification document comprises placing the identification document that includes a laminate surface and a substrate.

19. The method of claim 18, wherein placing the identification document comprises placing the identification document with the metalized structure as a layer located under the laminate surface.

20. The method of claim 19, wherein placing the identification document comprises placing the identification document with the metalized structure that includes an optically variable device (OVD).

21. A method to embed a security feature into an identification document identifying a holder of the identification document, the method comprising:
applying a laser beam on a portion of a metalized structure embedded within an identification document, the metalized structure comprising an opaque material and being embedded below an external surface of the identification document;
removing metal from the portion of metalized structure in response to applying the laser beam; and
creating a spatial pattern in the metalized structure by applying the laser beam to at least one more portion of the metalized structure, the created spatial pattern comprising one or more features that correspond to identification information associated with the holder of the identification document and visible from a front side and a rear side of the identification document.

22. The method of claim 21, wherein applying the laser beam comprises:
configuring the laser beam at a lower energy state relative to an energy state of a laser beam configured for a laser engraving operation; and
maintaining a structural integrity of layers within the identification document upon applying the laser beam having the lower energy state to the metalized structure.

23. The method of claim 21, wherein configuring the laser beam at the lower energy state comprises configuring a laser emitting the laser beam at a current of about 20 Amperes and a speed of about 400 mm/s.

24. The method of claim 21, wherein removing the metal from the portion of the metalized structure in response to applying the laser beam comprises:
heating the portion of the metalized structure using the laser beam absorbed at the portion of the metalized structure;
dewetting the metal from the portion of the metalized structure in response to the heating.

25. The method of claim 21, wherein the metalized structure is one of a kinegram, a hologram, an exelgram, or a pixelgram.

26. The method of claim 21, wherein creating the spatial pattern that comprises the one or more features corresponding to the identification information associated with the holder of the identification document comprises:
carving a first feature comprising micro alphanumeric characters that are visible through an enhanced viewing apparatus and are not visible without using the enhanced viewing apparatus; and
carving a second feature comprising alphanumeric characters that are visible with or without the enhanced viewing apparatus.

27. The method of claim 26, wherein:
a size of the second feature is larger than a size of the first feature; and
the second feature is formed at a different location in the metalized structure than a location of the first feature in the metalized structure.

28. The method of claim 21, wherein:
the one or more features are visible upon transmission of a radiation wave through the one or more features; and
the one or more features are not visible without transmission of a radiation wave through the one or more features.

29. The method of claim 28, wherein the radiation wave is a light wave transmitted from a light source.

30. The method of claim 21, wherein the spatial pattern corresponds to one or more gaps in the metalized structure.

* * * * *